US011372950B2

(12) United States Patent
Lesser

(10) Patent No.: US 11,372,950 B2
(45) Date of Patent: Jun. 28, 2022

(54) APPARATUS AND METHOD AND COMPUTER PROGRAM FOR RETRIEVING A REMOTE MEDIA CONTENT AND VEHICLE OR AIRCRAFT

(71) Applicant: Cinemo GmbH, Karlsruhe (DE)

(72) Inventor: Richard Lesser, Karlsruhe (DE)

(73) Assignee: Cinemo GmbH, Karlsruhe (DE)

( * ) Notice: Subject to any disclaimer, the term of this patent is extended or adjusted under 35 U.S.C. 154(b) by 281 days.

(21) Appl. No.: 16/690,461

(22) Filed: Nov. 21, 2019

(65) Prior Publication Data
US 2020/0104467 A1 Apr. 2, 2020

Related U.S. Application Data

(63) Continuation of application No. PCT/EP2018/063540, filed on May 23, 2018.
(Continued)

(51) Int. Cl.
| | |
|---|---|
| *H04N 7/16* | (2011.01) |
| *G06F 21/10* | (2013.01) |
| *G06F 21/62* | (2013.01) |
| *G10L 25/51* | (2013.01) |
| *H04W 12/084* | (2021.01) |
| *G06V 40/16* | (2022.01) |
| *H04W 12/63* | (2021.01) |

(52) U.S. Cl.
CPC .......... *G06F 21/10* (2013.01); *G06F 21/6245* (2013.01); *G06V 40/172* (2022.01); *G10L 25/51* (2013.01); *H04W 12/084* (2021.01); *G06F 2221/0704* (2013.01); *H04W 12/63* (2021.01)

(58) Field of Classification Search
CPC .. G06F 21/10; G06F 21/6245; H04W 12/084; G06K 9/00288; G10L 25/51
USPC ......................................................... 726/28
See application file for complete search history.

(56) References Cited

U.S. PATENT DOCUMENTS 9,537,865 B1 1/2017 Borovoy et al.
9,813,144 B2 * 11/2017 Lauer .................... H04L 49/15
(Continued)

FOREIGN PATENT DOCUMENTS

| EP | 3002966 A1 | 4/2016 |
| WO | 2012048928 A1 | 4/2012 |

OTHER PUBLICATIONS

Se'bastien Laborie; Managing and Querying Distributed Multimedia; IEEE:2009; pp. 12-20.*

*Primary Examiner* — Monjur Rahim
(74) *Attorney, Agent, or Firm* — Perkins Coie LLP; Michael A. Glenn

(57) ABSTRACT

An apparatus for retrieving a remote media content owned by a user to a vehicle or an aircraft, includes an authorization controller for obtaining an access authorization from the user, the access authorization indicating that the authorization controller is authorized to access the remote media content; a detector for detecting whether the user is located at or in the vehicle or the aircraft and for generating a detection result; and a media content retriever for retrieving the remote media content using the access authorization when the detection result indicates that the user is located at or in the vehicle or the aircraft and for not retrieving the remote media content when the detection result indicates that the user is not located at or in the vehicle or aircraft.

22 Claims, 10 Drawing Sheets

Related U.S. Application Data

(60) Provisional application No. 62/514,592, filed on Jun. 2, 2017.

(56) References Cited

U.S. PATENT DOCUMENTS

| | | | |
|---|---|---|---|
| 9,819,673 B1* | 11/2017 | Johansson | H04W 12/069 |
| 10,999,620 B2* | 5/2021 | Ferrer | H04N 21/20 |
| 2012/0102566 A1* | 4/2012 | Vrancken | H04L 63/10 |
| | | | 726/20 |
| 2013/0343574 A1* | 12/2013 | Muthugounder Devarajan | H03G 3/3089 |
| | | | 381/107 |
| 2014/0229568 A1* | 8/2014 | Raffa | H04W 4/20 |
| | | | 709/217 |
| 2014/0270357 A1* | 9/2014 | Hampiholi | G06T 7/73 |
| | | | 382/103 |
| 2016/0185358 A1* | 6/2016 | Todasco | B60K 28/02 |
| | | | 701/48 |
| 2016/0234281 A1* | 8/2016 | Padmanabhan | H04W 4/18 |
| 2017/0054842 A1* | 2/2017 | Choi | H04W 4/40 |
| 2018/0083961 A1* | 3/2018 | Lewis | G06F 21/44 |
| 2019/0155995 A1* | 5/2019 | Bangole | G06F 21/10 |

* cited by examiner

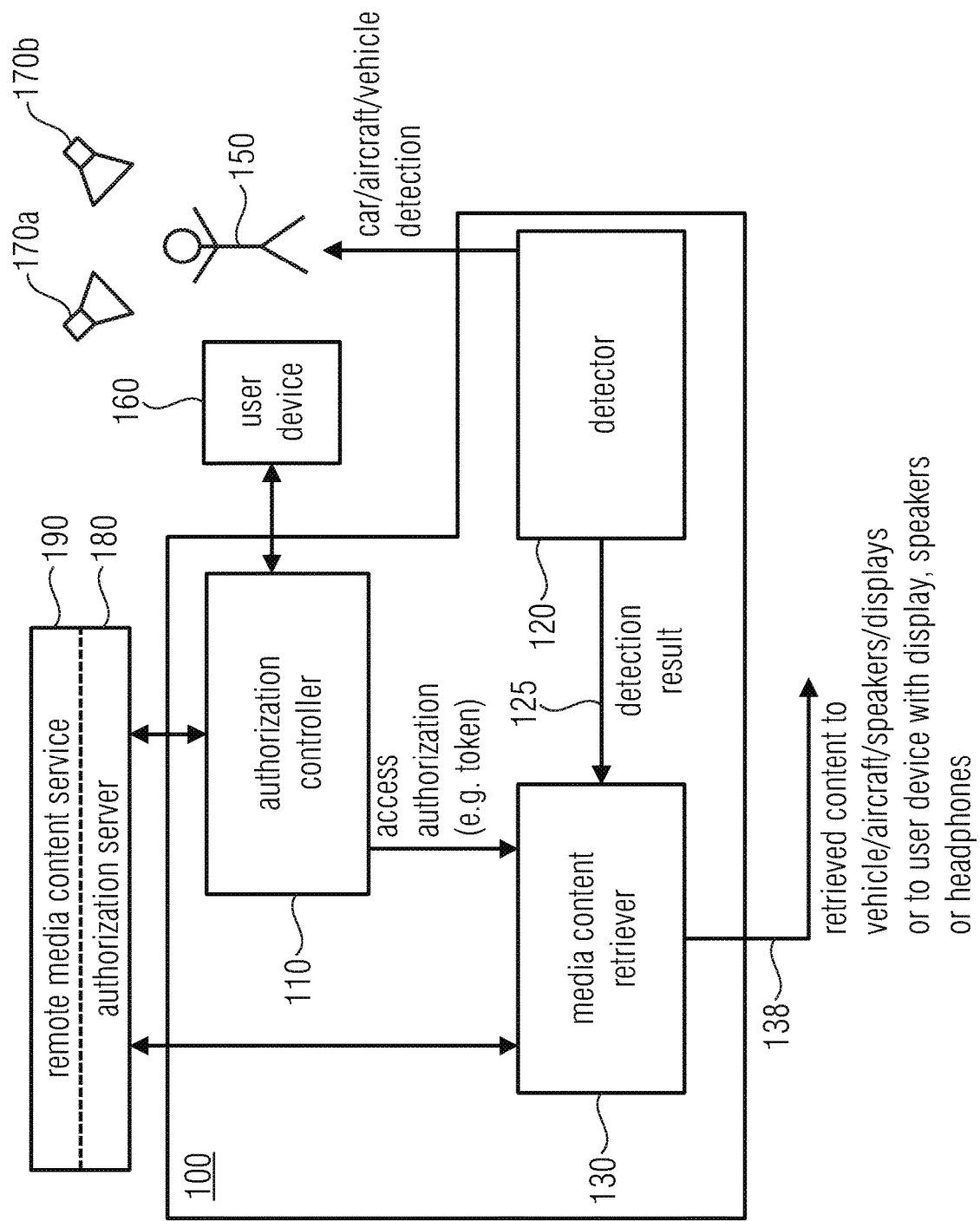

APPARATUS AND METHOD AND COMPUTER PROGRAM FOR RETRIEVING A REMOTE MEDIA CONTENT AND VEHICLE OR AIRCRAFT

CROSS-REFERENCES TO RELATED APPLICATIONS

This application is a continuation of copending International Application No. PCT/EP2018/063540, filed May 23, 2018, which is incorporated herein by reference in its entirety, and additionally claims priority from U.S. application Ser. No. 62/514,592, filed Jun. 2, 2017, which is incorporated herein by reference in its entirety.

The present invention relates to retrieving remote media content by a user to a vehicle or an aircraft and, in particular, to an apparatus, method and computer program for retrieving such remote media content in a convenient but nevertheless secure manner.

BACKGROUND OF THE INVENTION

European patent EP 2628305 B1 discloses a concept for a distributed playback architecture for media data, in which an example use case relates to front and/or rear-seat entertainment units usable in vehicles, or aircrafts, where vehicles can be any land, sea or air vehicles. In particular, solutions are provided to simultaneously present the same media content such as a DVD video disc inserted into a single device. For economic reasons, it is desirable to make use of an existing network infrastructure rather than dedicated high-bandwidth equipment, cables etc., that may be used for the transmission of audio and video signals to and from each unit, especially when the audio and video signals are provided in a certain raw format.

Alternatives to locally providing digital content to the vehicles consist in retrieving remote media content into the car and rendering the remote media content from within the car. When a user enters a car, such as a cab or any other public or private transport vehicle, the user could connect herself or himself (by means of a personal device like a smartphone) to the remote service directly in order to stream remote media content from media content providers such as Spotify, iTunes or any other service or remote storage handling media content owned by the user.

However, it may be more convenient and more practical for the user when the user does not access the remote service by herself or himself but when the user authorizes a certain head unit or a corresponding apparatus located within the vehicle or aircraft to access the corresponding service on behalf of the user, e.g. because the vehicle could have a better antenna. Such a procedure, however, raises several issues related to security, authorization or convenience. Open protocols exist such as the OAuth protocol that provides a standardized and secure application programming interface (API) authorization for desktop and web and mobile applications. Typically, a user or resource owner can give a third party or a client the access to her or his data where the data to be accessed is provided by a further service, i.e., the resource server. This protocol allows a procedure in which the user does not have to give her or his personal secrets or login credentials to the client that may, for example, be located within a publically accessible vehicle or aircraft. Thus, the user can authorize third parties in order to consume a certain service in the user's name without being forced to forward user secrets to third parties.

To this end, an authorization server connected to the resource server provides, after some back and forth communication, an access token to the third-party client and the third party client then accesses the resource server for a certain media content. The resource server then verifies, whether the received token is in order and, if this is the case, a certain media content is provided to the client and the client can then render the media content in a certain way such as using a front and/or rear seat entertainment system as discussed in the above referenced European patent. A problematic issue, however, is that the access tokens might have an unlimited validity or a validity that depends on a certain time span. In other words, an access token might work forever or lose its validity when a certain time period has passed since the issuance of the access token or when a certain time has passed such as a certain clock time.

This time-coupled validity management of the access tokens, however, is inconvenient for users being temporarily located within the vehicle or aircraft. Typically, the time durations, which a user spends in a vehicle can be extremely different. When the user enters a subway train or a public bus, for example, the travelling time can be quite short in the order of minutes or a quarter of an hour. The same is true for a user entering a cab.

However, there can also be long distance cab rides being longer than an hour and when a user, for example, enters an aircraft, for example for an overseas flight, the user will spend several hours within the aircraft. The same is true for a long distance train excursion, where the user can also spend several hours within a train.

When the user wants to access his media items from a remote media service, the user can, of course, use the above described protocol. However, it is not easy to set the validity times for the access tokens. When the validity periods are set quite short then the user has to undergo the access token procedure several times when being located in a vehicle or an aircraft. On the other hand, a quite short validity period enhances the security of the whole procedure.

When the time periods are set to quite long time durations then the convenience increases but the security sharply decreases. When, for example, a user only spends a short amount of time within a vehicle and when, nevertheless, the access token has a validity that is set to a very high time value then the head unit within the vehicle is in the possession of a valid access token even though the user is not in or at the vehicle or aircraft anymore. This compromises the user's privacy and the user's willingness to adopt a corresponding service.

Therefore, it is an object of the invention to provide an improved retrieval of remote media content that is flexible and, nevertheless, provides an improved user convenience together with an enhanced data security for user data.

SUMMARY

According to an embodiment, an apparatus for retrieving a remote media content owned by a user to a vehicle or an aircraft may have: an authorization controller for obtaining an access authorization from the user, the access authorization indicating that the authorization controller is authorized to access the remote media content owned by the user, wherein the authorization controller is configured to obtain the access authorization in the form of an access token from an authorization server linked to a remote service handling the remote media content owned by the user; a detector for detecting whether the user is located at or in the vehicle or the aircraft and for generating a detection result; and a media content retriever for retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the media content retriever is configured to check whether the detection result indicates that the user is located at or in the vehicle or aircraft, and to only send a get resource request together with the access token as the access authorization to the remote service, when the detection result indicates that the user is located at or in the vehicle or aircraft, and wherein the apparatus for retrieving is configured to not store any user login credentials authorizing the user at the remote service handling the remote media content owned by the user.

According to another embodiment, a method of retrieving a remote media content owned by a user to a vehicle or an aircraft may have the steps of: obtaining an access authorization from the user, the access authorization indicating that there is an authorization to access the remote media content owned by the user, wherein the obtaining includes obtaining the access authorization in the form of an access token from an authorization server linked to a remote service handling the remote media content owned by the user; detecting whether the user is located at or in the vehicle or the aircraft and generating a detection result; and retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the retrieving includes: checking, whether the detection result indicates that the user is located at or in the vehicle or aircraft, and only sending a get resource request together with the access token as the access authorization to the remote service, when the detection result indicates that the user is located at or in the vehicle or aircraft, and wherein the method of retrieving does not store any user login credentials authorizing the user at the remote service handling the remote media content owned by the user.

According to another embodiment, a vehicle or aircraft may have: a media presentation device; the inventive apparatus for retrieving a remote media content, wherein the apparatus for retrieving is configured to forward the remote media content to the media presentation device when a detection result indicates that the user is located at or in the vehicle or aircraft, and to not forward the remote media content to the media presentation device or to control the media presentation device to not present the media content when a detection result indicates that the user is not located at or in the vehicle or aircraft.

According to another embodiment, a method of operating a vehicle or an aircraft may have the steps of: performing a media presentation; retrieving a remote media content in accordance with the inventive method, wherein the method of retrieving includes forwarding the remote media content to the media presentation device, when a detection result indicates that the user is located at or in the vehicle or aircraft, and not forwarding the remote media content to the media presentation step or to control the media presentation step to not present the media content, when a detection result indicates that the user is not located at or in the vehicle or aircraft.

A non-transitory digital storage medium may have a computer program stored thereon to perform the method of retrieving a remote media content owned by a user to a vehicle or an aircraft, the method including: obtaining an access authorization from the user, the access authorization indicating that there is an authorization to access the remote media content owned by the user, wherein the obtaining includes obtaining the access authorization in the form of an access token from an authorization server linked to a remote service handling the remote media content owned by the user; detecting whether the user is located at or in the vehicle or the aircraft and generating a detection result; and retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the retrieving includes: checking, whether the detection result indicates that the user is located at or in the vehicle or aircraft, and only sending a get resource request together with the access token as the access authorization to the remote service, when the detection result indicates that the user is located at or in the vehicle or aircraft, and wherein the method of retrieving does not store any user login credentials authorizing the user at the remote service handling the remote media content owned by the user; when said computer program is run by a computer.

Another non-transitory digital storage medium may have a computer program stored thereon to perform the method of operating a vehicle or an aircraft, the method including: performing a media presentation; retrieving a remote media content in accordance with the inventive method, wherein the method of retrieving includes forwarding the remote media content to the media presentation device, when a detection result indicates that the user is located at or in the vehicle or aircraft, and not forwarding the remote media content to the media presentation step or to control the media presentation step to not present the media content, when a detection result indicates that the user is not located at or in the vehicle or aircraft; when said computer program is run by a computer.

The present invention is based on the finding that a convenient, flexible and, nevertheless, secure procedure is provided by a concept for retrieving a remote media content owned by a user to a vehicle or an aircraft. A detection whether the user is located at or in the vehicle or aircraft is provided. Furthermore, an access authorization indicating that the client or third party is authorized to access the remote media content is used but this usage in order to retrieve the remote media content is not done without any conditions. Instead, the remote media content is only retrieved from a remote media content server when, in addition to the access authorization, a detection has been made that the user is still located in or at the vehicle or aircraft. In other words, when the user has left the aircraft or vehicle, then a media content retrieval is not performed anymore even though a still valid access authorization from the user might exist. Thus, even though, for example, a valid token that has not yet expired exists in the possession of the head unit for the vehicle or aircraft, a media access is not performed anymore since the detector has detected that the user has left the vehicle or aircraft.

In case of a currently performed streaming of user-owned data from the remote service or in case of a playback of downloaded user data by the head unit in the vehicle or aircraft, such a streaming or playback is stopped, when the detector has detected that the user has left the car.

To this end, the detector is, in the embodiment, configured to perform a detection either in certain time periods or in regular or non-regular time intervals or only driven by certain events. For example, when the head unit in the vehicle or aircraft senses a disconnection of a user device such as a mobile user device from the local wireless network provided, for example, by a hotspot within or at the vehicle or aircraft then a further detection can be started whether this is only a temporary connection failure or whether the disconnection state exists for a longer time period which would, in the end, mean that the user has left the vehicle or aircraft.

Further embodiments rely on other detection technologies such as optical detections or acoustical detections or a combination of several detection technologies such as wireless connection detection, optical detection and acoustical detection technologies.

The present invention is advantageous in that a user has the chance to fully access her or his remote media content conveniently via the vehicle or aircraft infrastructure. However, the user can be sure that as soon as the user leaves the vehicle or aircraft then the access to her or his remote media content is stopped even though access tokens might still exist with a validity period that has not yet been expired.

On the other hand, it is advantageous to use some kind of protocol to obtain such access tokens in a way in which the user does not have to give her or his login credentials to the head unit. Instead, the head unit only forwards messages back and forth between the user device and the remote media service without having the chance to actually look into the login credentials and to store the login credentials. Thus, the user can feel safe in that her or his personal secrets are not given out to a third party but the user can nevertheless enjoy her or his remote media items in a vehicle or aircraft different from her or his own vehicle. The user can feel safe that, as soon as the user leaves the vehicle or aircraft, any data access to the remote media items is made impossible due to the detection that the user has left the vehicle or aircraft.

Thus, even though long validity periods for a high user convenience are associated with access tokens, these long validity periods do not compromise data security. Hence, user convenience on the one hand and data security on the other hand and, additionally, a reasonable resource usage due the avoidance of unnecessary token "traffic" are obtained.

BRIEF DESCRIPTION OF THE DRAWINGS

Embodiments of the present invention will be detailed subsequently referring to the appended drawings, in which:

FIG. 1 illustrates a block diagram of an embodiment of the present invention;

DETAILED DESCRIPTION OF THE INVENTION

Figure 8:
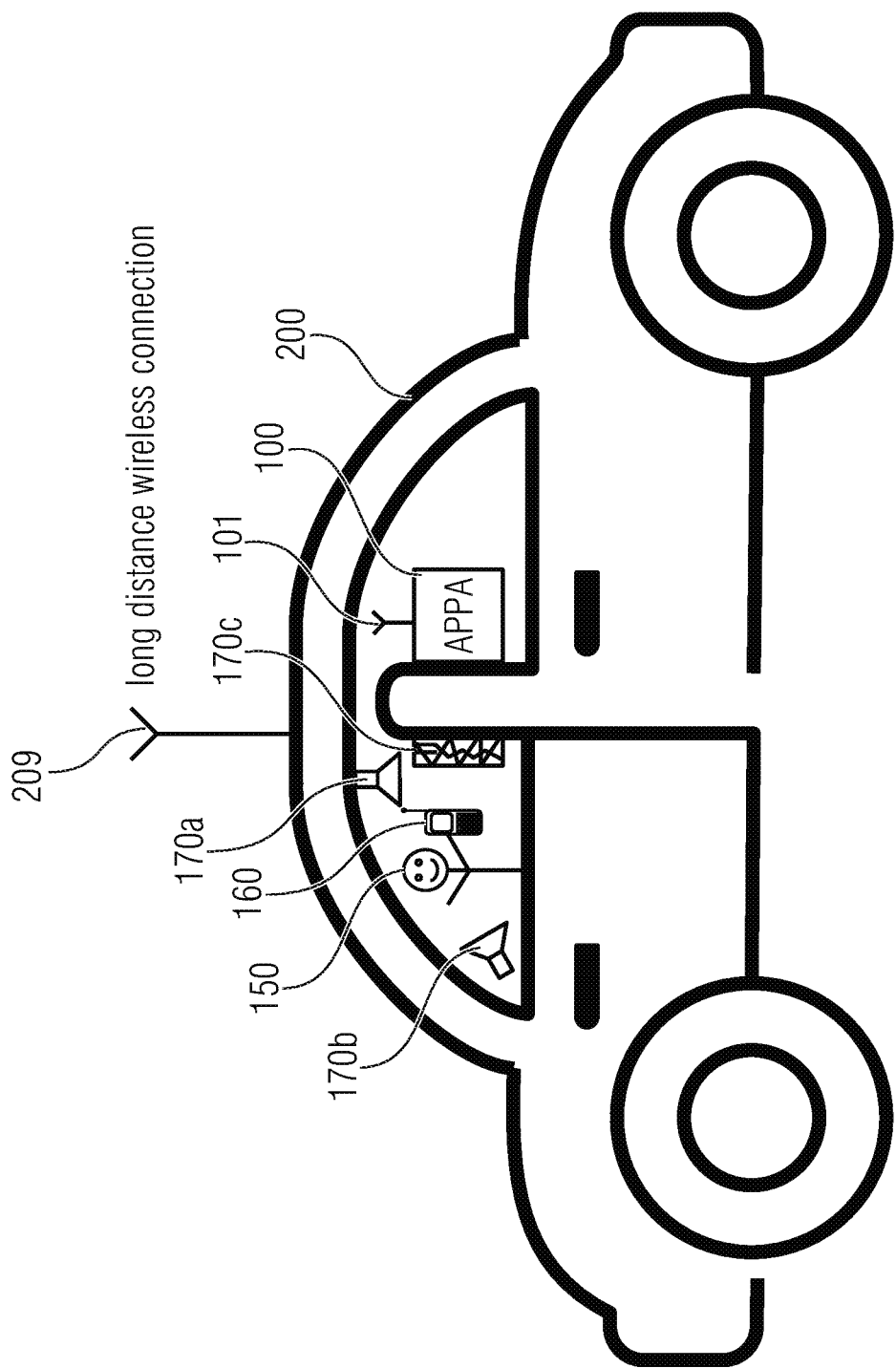
FIG. 8 an implementation of the vehicle or aircraft with the example of a car.

FIG. 1 illustrates an apparatus 100 for retrieving a remote media content owned by a user 150 to a vehicle or an aircraft 200 (illustrated in FIG. 8). The apparatus 100 comprises an authorization controller 110 for obtaining an access authorization from the user 150. The access authorization that can, for example, be a token such as an access token indicates that the authorization controller 110 is authorized to access the remote media content. The remote media content is, for example, located under the control of a remote media content service 190 that cooperates with an authorization server 180.

The apparatus 100 for retrieving a remote media content further comprises a detector 120 for detecting, whether the user 150 is located at or in the vehicle or the aircraft and for generating a corresponding detection result 125.

The apparatus 100 further includes a media content retriever 130 configured for retrieving the remote media content typically from the remote media content service 190 using the access authorization such as the access token, when the detection result indicates that the user is located at the or in the vehicle or aircraft. The media content retriever is furthermore configured for not retrieving the remote media content, when the detection result indicates that the user is not located at or in the vehicle or aircraft even though a valid access authorization such as a non-expired access token exists.

In case of a positive detection result, i.e., that the user 150 is still in the car/aircraft/vehicle, the retrieved media content is forwarded to a media presentation device comprising, for example, speakers 170a, 170b or a display 170c illustrated in FIG. 8 so that the user can acoustically and/or optically enjoy her or his remote media content. The user could also use her or his own device directly or via headphones.

Figure 4:
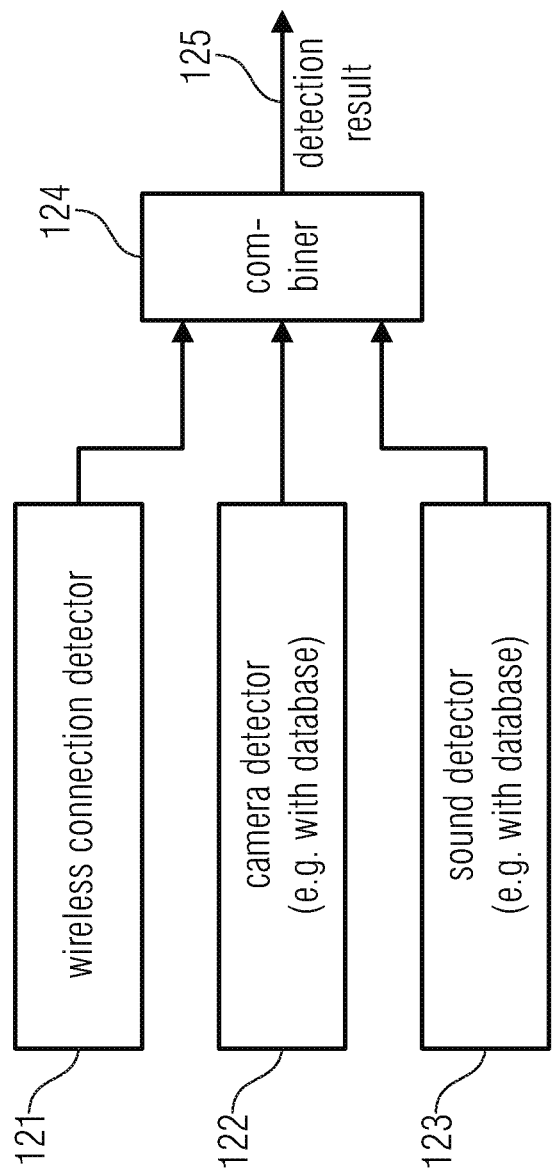
FIG. 4 illustrates an implementation of a detector.

FIG. 4 illustrates an implementation of the detector in certain embodiments. In a first embodiment, only one of the three detectors 121 being a wireless connection detector or 122 being a camera detector or 123 being a sound detector exists.

In such an implementation, a combiner 124 does not exist in order to provide the detection result. Alternatively, however, even two or all three of the different detector embodiments 121 to 123 can exist concurrently and, the results of the detectors are forwarded to the combiner 124. The combiner could then perform, for example, a majority decision so that, when two detectors of the group of detectors 121 to 123 indicate that the user in within the car, then the detection result 125 indicates that the user is actually in the vehicle or aircraft. When, however, only one of the three instances outlines that a user is detected and the other two indicate that the user is not detected, then the detection result would be negative.

Alternatively, other combination algorithms can be performed, so that the positive detection result is indicated when only one out of three or two or all three detector instances 121 to 123 indicate the presence of a user in or at the vehicle or aircraft.

In an embodiment, the wireless connection detector is configured to detect the wireless connection to a mobile device such as the user device 160 owned by the user. Then, the detector is configured to generate the detection result based on whether the wireless connection exists or not.

The camera detector 122 is, in an embodiment, configured to take a photograph of a potential user or any other face detection method, and to then access a database based on the photograph and to generate the detection result indicating that the potential user is located at or in the vehicle or aircraft depending on whether a match in the database was found or not. The database could be a local database within the car, where either photographs or biometric data typically extracted from photographs are stored from different users that have, for example, been in the car earlier or that are authorized to actually use the car at all. Then, without any user interaction, the presence of the user is detected, when a match within the local database typically stored within the apparatus 100 of FIG. 1 is detected. When, however, any match is not detected, then, although a certain potential user is within the car, the media retriever is not started. Or, alternatively, when a potential user is detected by the optical detection, and when no match for the user is found in the database, then the authorization procedure is started by the authorization controller 110.

However, even when, at a certain time interval, a user change is detected, i.e., a new user that is different from the earlier user, any media content retrievals for the earlier user are stopped, since such a detection indicates that the earlier user has left the vehicle or aircraft.

The alternative sound detector 123 may operate similar to the camera detector, but now by recording a sound instead of a photograph and by then accessing a local database using the recorded sound so that, based on certain speech recognition procedures, a match in the local database is found.

The further procedure for the sound detector can be similar as discussed before with respect to the camera detector 122.

Figure 5:
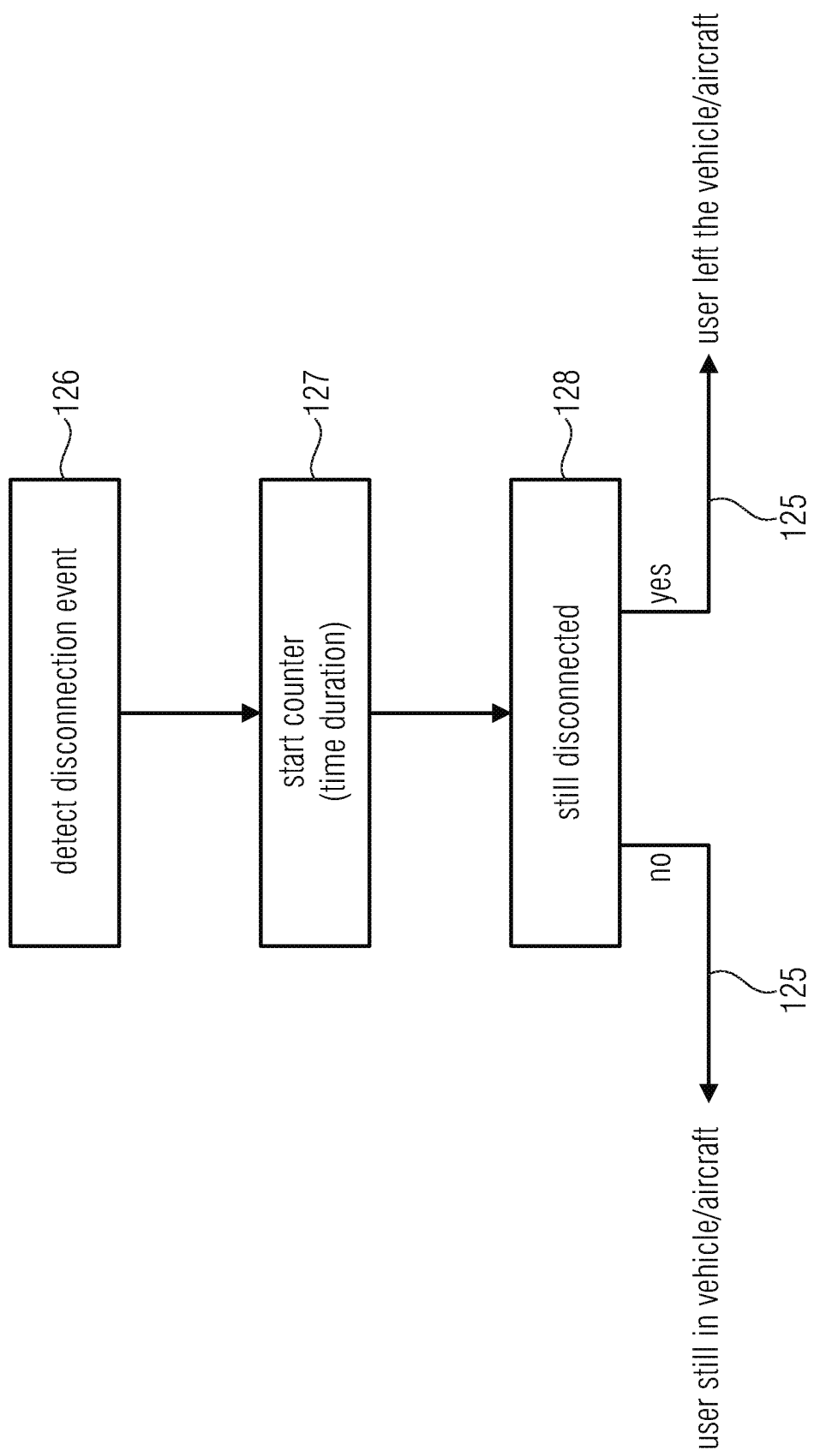
FIG. 5 illustrates a further implementation of the detector together with a time duration.

In a further embodiment illustrated in FIG. 5, the wireless connection detector 121 may detect a disconnection event 126. However, based on this disconnection event, the streaming is not immediately stopped, but, in step 127, a counter is started. The counter counts until a certain counting value corresponding to a certain predefined time duration. Then, in step 128, and when the certain time duration has expired, a check is made, whether the user device is still disconnected. If it is determined that the user is not disconnected anymore, then the detection result will be that the user is still in or at the vehicle or aircraft. When, however, it is detected in the check 128 that the user is still disconnected, then the detection result 125 will be that the user has left the vehicle or aircraft.

Advantageously, the time duration that is measured, for example, by the counter in block 127 is in a range between one second and twenty minutes. Advantageously, the time duration is even in a smaller ranger such as between one second and one minute.

Thus, it is made sure that any unintentional or intermediate disconnection as done by the user herself or himself or due to some disturbances of the wireless system do not result in a termination of the media streaming.

The media content receiver 130 is, in an implementation, configured to receive a media stream from a remote streaming service due to an earlier media content retrieval based on a valid access authorization and a positive detection result 125. However, the media content retriever stops a currently existing media stream in response to a detection result 125, when the detection result indicates that the user is not located at or in the vehicle or aircraft anymore.

In an implementation, the authorization controller 110 is configured to obtain the access authorization in the form of an access token from the authorization server 180 that is linked to a remote media content service 190 handling the remote media content. Furthermore, the apparatus for retrieving the media content indicated at 100 in FIG. 1 is configured to not store any user login credentials for authorizing the user 150 at the remote service 190.

To this end, the authorization controller may perform an operation in accordance with a protocol as defined by an OAuth standard such as OAuth 1.0 or 2.0 or related protocols.

Figure 3:
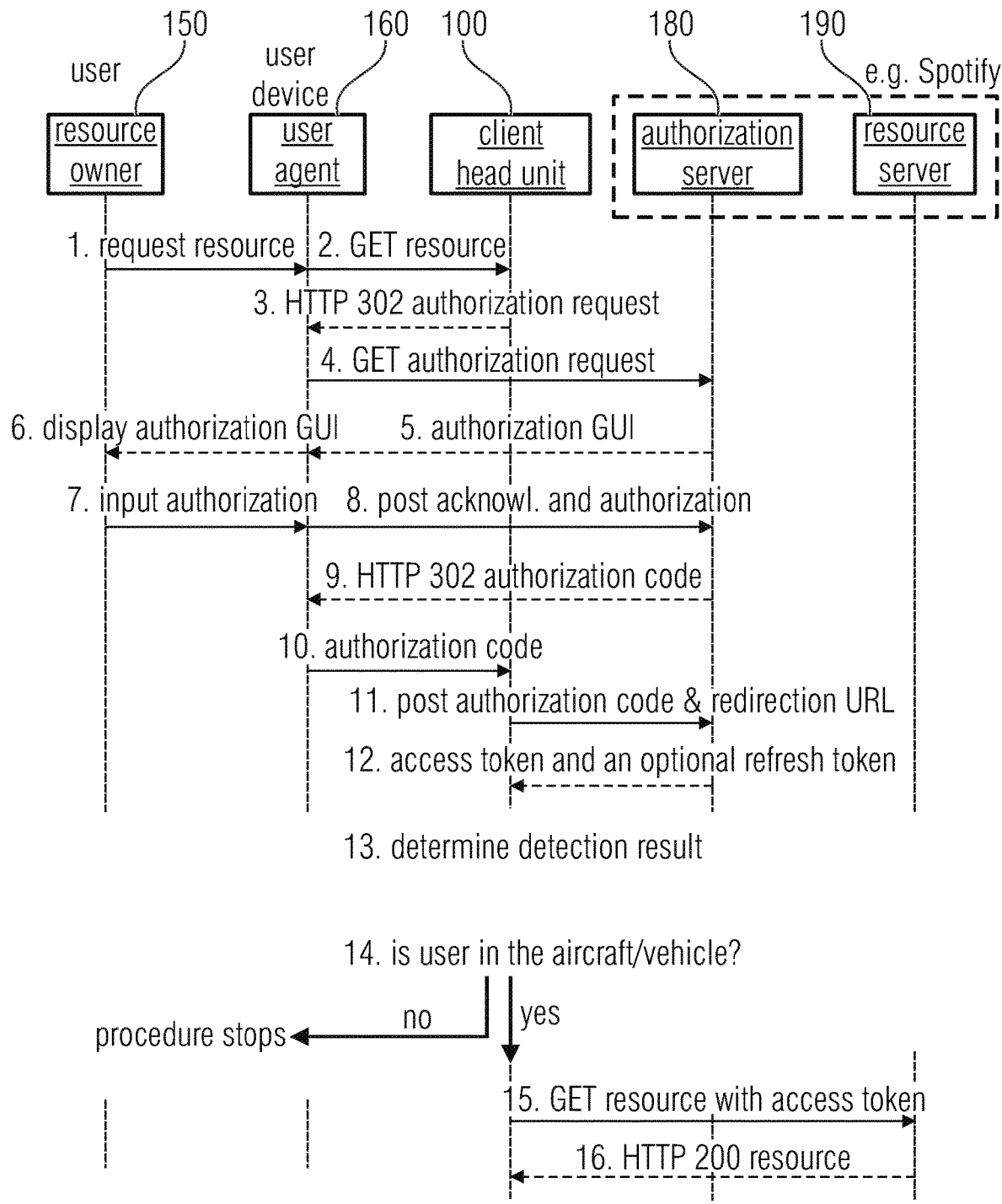
FIG. 3 illustrates an implementation of the procedure performed by the authorization controller and the media content retriever in the context of a user device and an authorization server/resource server.

FIG. 3 illustrates a procedure showing the messages and actions between the resource owner or user 150, the user device or user agent 160, the client or vehicle/aircraft head unit 100, the authorization server 180 and the resource server 190 that can be any remote media content service such as Spotify, iTunes etc.

In a first step, the user forwards a request resource message to the user agent, i.e., her or his mobile device, and the mobile device 160 then forwards a get resource message to the client or head unit 100 of FIG. 1. The head unit or client 100 replies with an http 302 authorization request. Then, the user device forwards, via the client, a get authorization request to the authorization server of the selected service. The authorization server 180 then replies, again via the client with a graphic user interface from the authorization server that is now displayed at the user agent, i.e., the user's mobile device 160. The user 150 then looks to the displayed graphic user interface and, then, as illustrated as step 7, inputs her or his user credentials into the user device 160. Then, the user agent forwards, again advantageously via the head unit a post acknowledgement and authorization message to the authorization server 180 that, in case of a positive authorization, forwards an authorization code back to the user device once again via the head unit. Then, the user agent, i.e., the user's mobile device forwards the authorization code back to the client and the client can then forward the authorization code to the authorization server in message 11 illustrating a post authorization code and redirection URL message. The authorization server 180 then replies via sending an access token and an optional refresh token back to the client 100.

The client then determines, in step 13, a detection result from the detector 120 of FIG. 1 and, based on the detection result, the client determines in step 14, whether the user is in or at the aircraft or vehicle. If the detection result is so that the user is not in or at the aircraft or vehicle, then the procedure stops as illustrated in FIG. 3. When, however, it is determined that the user is in the aircraft or vehicle, the client requests, via item 15, the resource from the resource server in exchange of the access token and, then, when the resource server 190 has checked the validity of the access token and that the access token has not expired, the resource server 190 forwards the requested resource to the client for further usage by the client as illustrated at 138 in FIG. 1.

FIGS. 2a to 2f illustrate several procedures related to the client and the user and, particularly, to the user device.

Figure 2A:
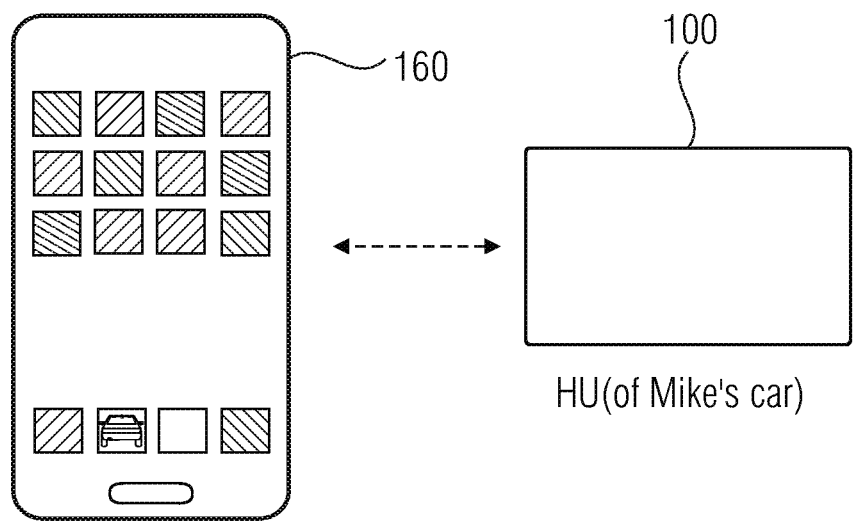
FIGS. 2a to 2f illustrate different user device display settings accessible by a user to control the apparatus for retrieving a remote media content.

FIG. 2a illustrates the cooperation between the head unit or apparatus for retrieving a remote media content 100 and the user device 160. Particularly, as illustrated in FIG. 2a, a guest passenger within a vehicle or cab or aircraft pairs her or his phone/tablet 160 via Bluetooth to the car's head unit 100 or connects to the car's Wi-Fi network.

Figure 2B:
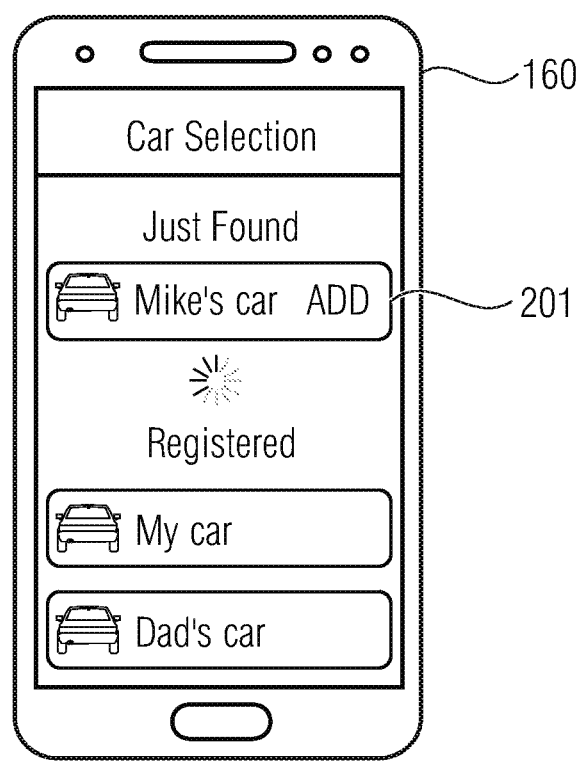

FIG. 2b illustrates a display of the user's mobile device where the guest passenger starts a car maker's App on his or her phone/tablet. The App discovers and identifies the car's head unit illustrated at 201. The passenger then adds the new car, in this example Mike's car to the list of known cars and configures same. This is done by the user actuating the Add button illustrated at 201 in FIG. 2b.

Figure 2C:
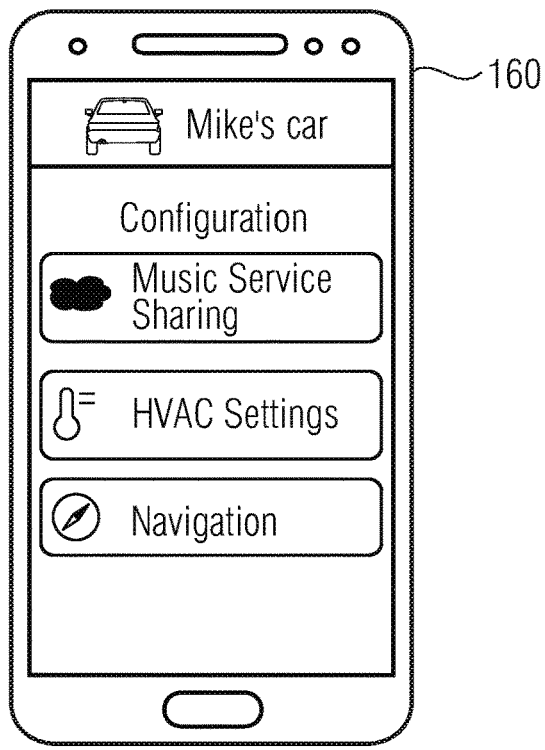

Then, as illustrated in FIG. 2c, a configuration page for Mike's car is open. The configuration page for Mike's car allows several alternatives such as a navigation alternative or an HVAC settings alternative (HVAC=heating ventilating air condition) or a music service sharing alternative. The music service sharing alternative refers to the apparatus 100 for retrieving a remote media content owned by a user illustrated in FIG. 1, for example.

Figure 2D:
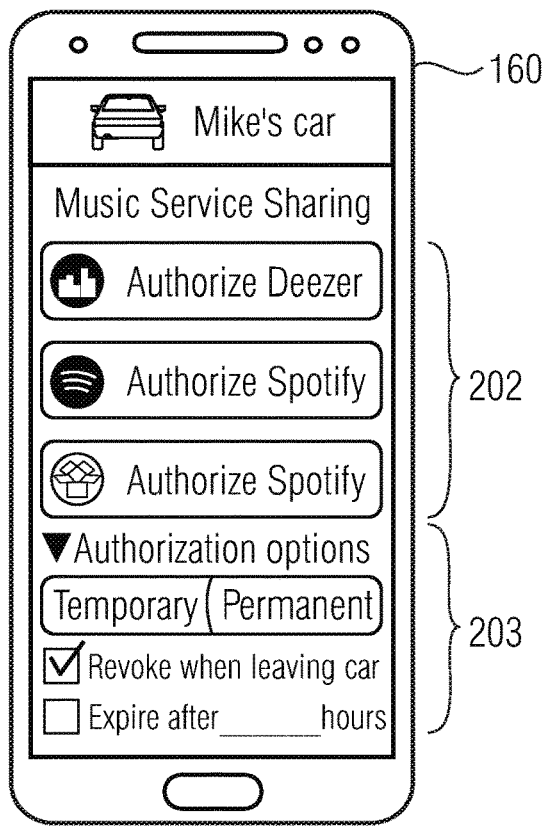

FIG. 2d shows a list of supported online services that appears on the user device 160 display, where this list of online services 202 allows the authorization of the individual services. Furthermore, in addition to the list of supported online services, a further list of authorization options 203 is shown to the user and this list provides the authorization options that are supported by the apparatus 100, i.e., the head unit of, in this example, Mike's car. The authorization options allow a temporary authorization or, alternatively, a permanent authorization or, in accordance with the present invention, an authorization "revoke when leaving car" or an alternative authorization option stating that an expiration expires after a certain of amount of hours where the certain amount can be input by the user.

The user now chooses when and how the authorization should be revoked. For example by setting an expiration time or when detecting that the passenger has left the car as can be, for example, detected by a Bluetooth or Wi-Fi_33 disconnection.

Figure 2E:

FIG. 2e illustrates further displays of the user device 160. When selecting a service for authentication, the user is now able to enter her or his credentials. In an example, OAuth 2.0 is used. The phone/tablet internal browser is presented by the App opening the correct authentication URL (unique resource locator) for that particular service. The service then creates an access token which is sent to the head unit 100 in Mike's car, where it is stored and managed according to the selected expiration policy such as a temporary or a permanent authorization.

In the left of FIG. 2e, the selected Spotify authorization GUI is presented, and in the right illustration in FIG. 2e a user is prompted to authorize or decline that the head unit 100 wants to access account information and music library.

Figure 2F:
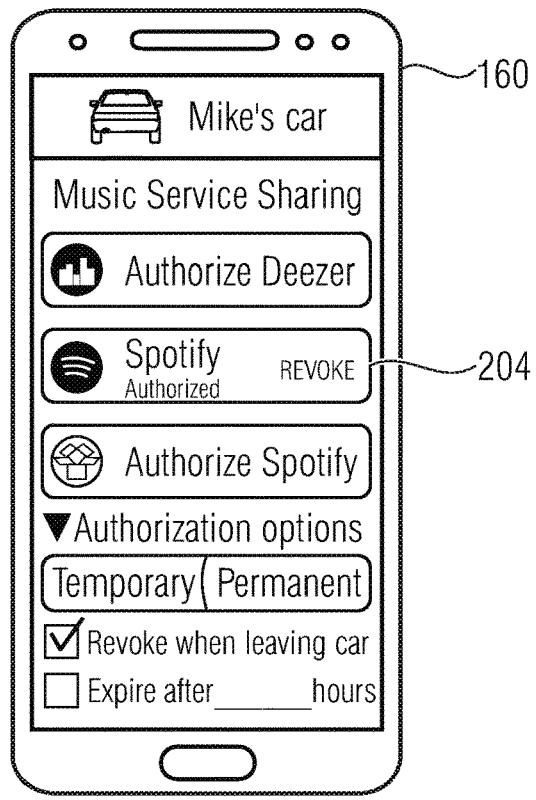

FIG. 2f illustrates a situation, where the online service is now authorized and the head unit 100 in Mike's car is able to browse, search, and playback content of the passenger's or user's online service account. The authorization can also be manually revoked by the passenger using the car maker's App provided by the apparatus 100, for example, by actuating the revoke button 204 in FIG. 2f.

When FIG. 3 is compared to FIGS. 2a to 2f, then FIG. 2d is related to items 1, 2, 3 and 4 of the protocol illustrated in FIG. 3. FIG. 2e, left picture illustrates items 5 and 6, and the right picture in FIG. 2e illustrates items 7 and 8. FIG. 2f illustrates a display subsequent to items 9, 10, 11 and 12, i.e., where the head unit 100 is in possession of a non-expired access token.

Figure 6:
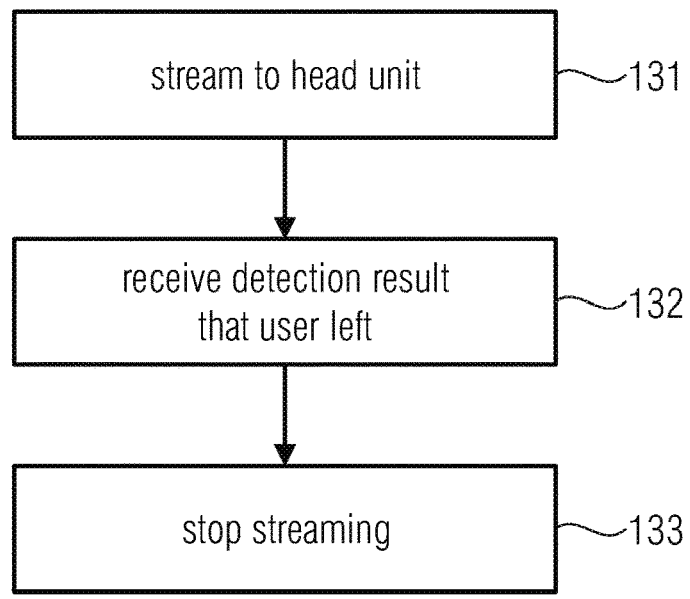
FIG. 6 illustrates a further implementation of the media content retriever.

FIG. 6 illustrates a situation, where a streaming to the head unit from the resource server is performed as illustrated as item 16 in FIG. 3. Subsequent to this procedure in block 131, the media content receiver 130 then receives a detection result that the user left the car or aircraft. Then, in block 133, the media content retriever stops a streaming job and, advantageously, notifies the resource server accordingly.

Figure 7:
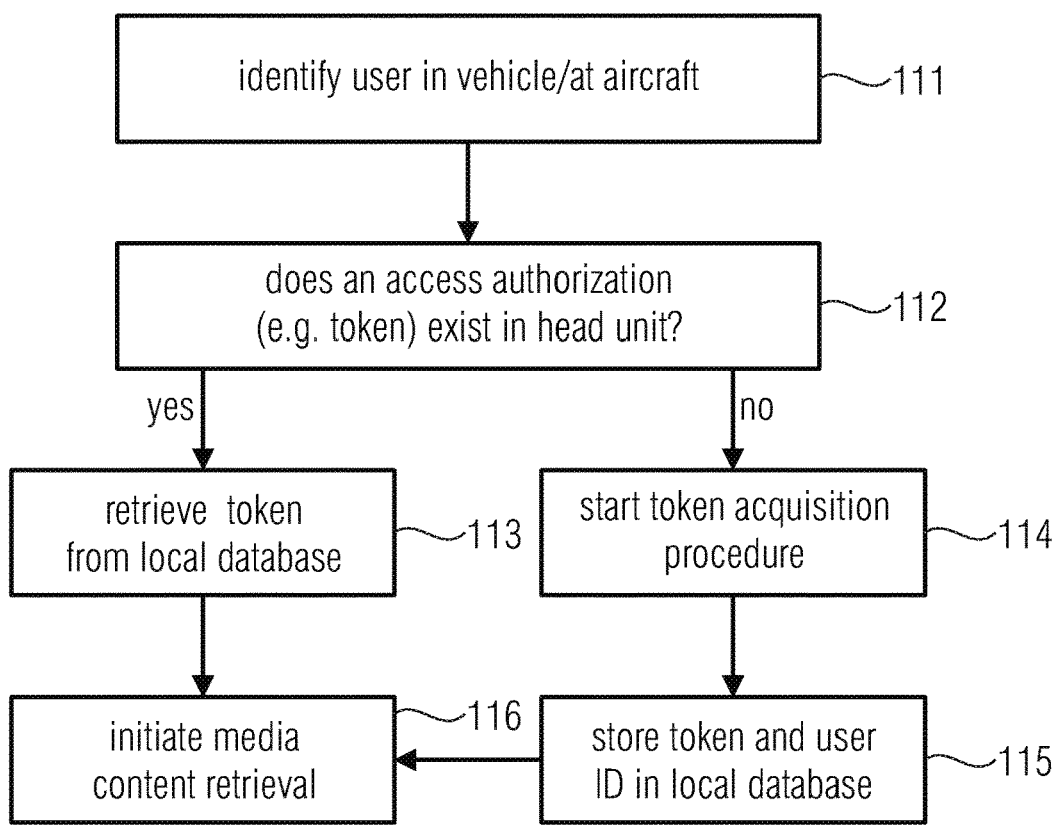
FIG. 7 illustrates a further implementation of the authorization controller.

FIG. 7 illustrates a further procedure performed by the authorization controller 110 in order to obtain an access authorization.

In a step 111, the authorization controller 110 identifies a new user in or at the vehicle or aircraft as, for example, discussed in the context of FIG. 2a.

Then, in a step 112, the authorization controller 110 checks, particularly, in a local database, whether an access authorization such as a valid token exists already in the head unit. This step could, for example, be performed in a situation, when Mike's car would already be registered as discussed in the context of FIG. 2b.

When it is determined that an access authorization for a certain identified user already exists in the head unit 100, then the procedure goes on to step 113, in which the token is retrieved from the local database. Then, as soon as the token is retrieved and when the token is determined as not expired, then the media content retrieval is initiated with this token and, naturally, only in case of a corresponding positive result, i.e., that the user is still in the car or aircraft.

When, however, step 112 comes to the result that an access authorization such as a valid token does not exist in the head unit for the user identified in block 111, then a token acquisition procedure 114 is started as discussed in the context of FIG. 3 or FIGS. 2a to 2f.

When a certain token is received by the head unit as, for example, illustrated in the context of step 12 in FIG. 3, then the head unit proceeds to store the token and the corresponding user ID in the head unit's local database as illustrate in block 115 in FIG. 7. Then, subsequent or concurrent to the storage, the media content retrieval 116 is performed.

FIG. 8 illustrates an implementation of the present invention within a vehicle and, particularly, within a car. The car has the head unit 100 indicated as apparatus (APPA) for retrieving the remote media content. The APPA or head unit 100 typically comprises some kind of small distance wireless connection facilities indicated by antenna 101.

Furthermore, the car additionally has a long distance wireless connection facility illustrated at antenna 209 that is also connected to the head unit or APPA 100.

Furthermore, the car has some entertainment functionalities such as speakers 170b, 170a and displays illustrated exemplarily at 170c and, naturally, the backseat passenger 150 having a mobile device 160.

Although the vehicle or aircraft is illustrated as a car or cab in FIG. 8, the vehicle can also be a train, a truck or a bus either for public or private transportation. Furthermore, the vehicle can be a water vehicle such as a boat, a ferry or a cruiser for public or private transportation. The aircraft can, for example, be a plane, a helicopter, a glider, an aerostat, an airship (Zeppelin) or any other aircraft for the purpose of public or private transportation.

Variants of the disclosed embodiments concern content distribution. More specifically, embodiments of the invention concern content authorization and authentication.

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Figure 9:
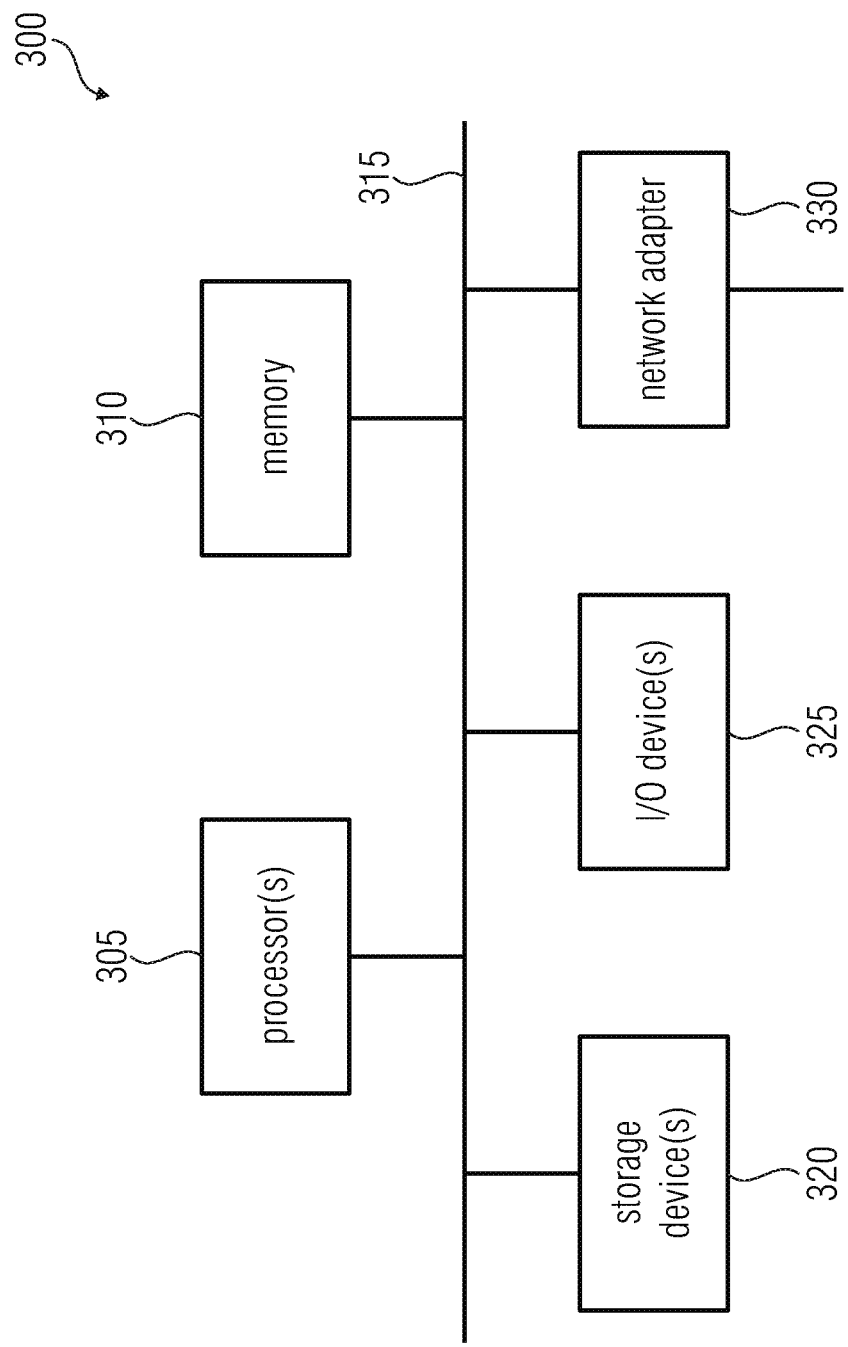
FIG. 9 a computer system usable for implementing the head unit or the apparatus for retrieving.

FIG. 9 is a block diagram of a computer system as may be used to implement certain features of some of the embodiments. The computer system may be a server computer, a client computer, a personal computer (PC), a user device, a tablet PC, a Laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Fire wire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and a computer readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for retrieving a remote media content owned by a user to a vehicle or an aircraft, comprising:
   an authorization controller for acquiring an access authorization from the user, the access authorization indicating that the authorization controller is authorized to access the remote media content owned by the user, wherein the authorization controller is configured to acquire the access authorization in the form of an access token from an authorization server linked to a remote service handling the remote media content owned by the user;
   a detector for detecting whether the user is located at or in the vehicle or the aircraft and for generating a detection result; and
   a media content retriever for retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the media content retriever is configured
      to check whether the detection result indicates that the user is located at or in the vehicle or aircraft, and
      to only send a get resource request together with the access token as the access authorization to the remote service, when the detection result indicates that the user is located at or in the vehicle or aircraft, and
   wherein the apparatus for retrieving is configured to not store any user login credentials authorizing the user at the remote service handling the remote media content owned by the user.

2. The apparatus of claim 1,
   wherein the detector is configured to detect a wireless connection to a user device, the user device being a mobile device owned by the user, and wherein the detector is configured to generate the detection result based on whether the wireless connection exists or not.

3. The apparatus of claim 1,
   wherein the detector is configured to take a photograph of a potential user, to access a data base based on the photograph and to generate the detection result indicating that the potential user is located at or in the car or aircraft or not, depending on whether a match in the database was found or not.

4. The apparatus of claim 1,
   wherein the detector is configured to record sound emitted by a potential user, to access a database based on the recorded sound and to generate the detection result indicating that the potential user is located at or in the car or aircraft or not, depending on whether a match in the database was found or not.

5. The apparatus of claim 2,
   wherein the detector is configured to detect a disconnection event in which a disconnection of the mobile device from the apparatus occurs, and
   wherein the detector is configured to only generate the detection result indicating that the user is not located in or at the vehicle or aircraft within a predetermined time duration since the disconnection event has passed and the user is still disconnected.

6. The apparatus of claim 5,
   wherein the predetermined time duration is in a range between one second and twenty minutes.

7. The apparatus of claim 1,
   wherein the media content retriever is configured to receive a media stream from the remote service being a remote streaming service, and
   wherein the media content receiver is configured to stop a currently existing media stream in response to a reception of the detection result indicating that the user is not located at or in the vehicle or aircraft.

8. Apparatus of claim 1,
   wherein the authorization controller is configured to operate in accordance with a protocol as defined by an OAuth standard.

9. The apparatus of claim 1,
   wherein the authorization controller is configured to detect a pairing of a mobile device to the apparatus for retrieving or to a wireless network of the vehicle or aircraft, and
   wherein the detector is configured to detect that the user is not located at or in the vehicle or aircraft anymore based on a disconnection event of the mobile device.

10. The apparatus of claim 1, wherein the authorization controller is configured
    to provide a group of supported remote services to the user, and
    to receive a user selection indicating a selected remote service from the group of supported services, the selected service being the remote service.

11. The apparatus of claim 1, wherein the authorization controller is configured
    to provide a group of authorization options to a user device, the group comprising at least two of the following members:
       temporary authorization, permanent authorization, expiration of a temporary authorization in a limited time span to be input from the user, and expiration of a temporary authorization in case of leaving the vehicle or the aircraft, and to receive a user selection indicating a user specified authorization option, and to activate the detector or the media content retriever when the user has selected the expiration of the temporary authentication in case of leaving the vehicle or the aircraft, wherein, in case of any other selection from the group, the media content retriever is configured to retrieve the remote media content irrespective of any detection result from the detector.

12. The apparatus of claim 1,
wherein the media content retriever is configured to browse, search or play back media content associated with an account of the user at an online media service handling the remote media content only when the access authorization is valid and when the detection result indicates that the user is located at or in the vehicle or aircraft.

13. The apparatus of claim 1, wherein the authorization controller is configured to receive the GET resource request from a user device, the user device being a mobile device or a device connected to the vehicle or aircraft and comprising an interface for receiving a user input;

to send an authorization request to the user device;

to forward a GET authorization request from the user device to the authorization server associated with a service for handling the remote media content; and to forward an authorization graphical user interface from the authorization server to the user device.

14. The apparatus of claim 1, wherein the authorization controller is configured to forward user credentials from the user device to the authorization server;

to forward an authorization code from the authorization server to the user device;

to receive the authorization code from the user device;

to request the access token as the access authorization from the authorization server; and to receive the access token from the authorization server.

15. The apparatus of claim 1,
wherein the media content retriever is configured to receive the media content in response to sending the access token to the authorization server, and to present the received media content at or in the vehicle or aircraft to the user by rendering the media content using a display or one or more speakers or by transmitting the media content to the user device for rendering by the user device.

16. The apparatus of claim 1,
wherein the vehicle is a car,
wherein the apparatus is a car head unit,
wherein the user has a user device being a mobile device, and
wherein the detector detects whether the user is in the car or not.

17. A method of retrieving a remote media content owned by a user to a vehicle or an aircraft, comprising:
acquiring an access authorization from the user the access authorization indicating that there is an authorization to access the remote media content owned by the user, wherein the acquiring comprises acquiring the access authorization in the form of an access token from an authorization server linked to a remote service handling the remote media content owned by the user;

detecting whether the user is located at or in the vehicle or the aircraft and generating a detection result; and retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the retrieving comprises:

checking, whether the detection result indicates that the user is located at or in the vehicle or aircraft, and only sending a get resource request together with the access token as the access authorization to the remote service, when the detection result indicates that the user is located at or in the vehicle or aircraft, and wherein the method of retrieving does not store any user login credentials authorizing the user at the remote service handling the remote media content owned by the user.

18. A vehicle or aircraft, comprising:
a media presentation device;
the apparatus for retrieving a remote media content in accordance with claim 1,
wherein the apparatus for retrieving is configured to forward the remote media content to the media presentation device when a detection result indicates that the user is located at or in the vehicle or aircraft, and to not forward the remote media content to the media presentation device or to control the media presentation device to not present the media content when a detection result indicates that the user is not located at or in the vehicle or aircraft.

19. The vehicle or aircraft in accordance with claim 18,
wherein the vehicle is a car, a cab, a bus or a train or a water vehicle such as a boat, a ferry or a cruiser, or wherein the aircraft is a plane, a helicopter, a glider, an aerostat or air ship.

20. A method of operating a vehicle or an aircraft, comprising:
performing a media presentation;
retrieving a remote media content in accordance with the method of claim 17,
wherein the method of retrieving comprises forwarding the remote media content to the media presentation device, when a detection result indicates that the user is located at or in the vehicle or aircraft, and not forwarding the remote media content to the media presentation step or to control the media presentation step to not present the media content, when a detection result indicates that the user is not located at or in the vehicle or aircraft.

21. A non-transitory digital storage medium having a computer program stored thereon to perform the method of retrieving a remote media content owned by a user to a vehicle or an aircraft, comprising:
acquiring an access authorization from the user, the access authorization indicating that there is an authorization to access the remote media content owned by the user, wherein the acquiring comprises acquiring the access authorization in the form of an access token from an authorization server linked to a remote service handling the remote media content owned by the user;

detecting whether the user is located at or in the vehicle or the aircraft and generating a detection result; and retrieving the remote media content owned by the user using the access authorization when the detection result indicates that the user is located at or in the vehicle or the aircraft and for not retrieving the remote media content owned by the user, when the detection result indicates that the user is not located at or in the vehicle or aircraft, wherein the retrieving comprises:
- checking, whether the detection result indicates that the user is located at or in the vehicle or aircraft, and
- only sending a get resource request together with the access token as the access authorization to the remote service, when the detection result indicates that the user is located at or in the vehicle or aircraft, and wherein the method of retrieving does not store any user login credentials authorizing the user at the remote service handling the remote media content owned by the user;

when said computer program is run by a computer.

22. A non-transitory digital storage medium having a computer program stored thereon to perform the method of operating a vehicle or an aircraft, comprising:
performing a media presentation;
retrieving a remote media content in accordance with the method of claim 17,
wherein the method of retrieving comprises forwarding the remote media content to the media presentation device, when a detection result indicates that the user is located at or in the vehicle or aircraft, and not forwarding the remote media content to the media presentation step or to control the media presentation step to not present the media content, when a detection result indicates that the user is not located at or in the vehicle or aircraft;
when said computer program is run by a computer.

* * * * *